United States Patent
Alba et al.

(10) Patent No.: US 11,582,986 B2
(45) Date of Patent: Feb. 21, 2023

(54) PROCESS FOR EXTRACTION OF PROTEIN FROM PLANT OR ALGAL MATTER

(71) Applicant: IMI TAMI Institute for Research and Development Ltd, Haifa Bay (IL)

(72) Inventors: Dina Alba, Yokneam Illit (IL); David Fuks, Haifa (IL); Aviad Karniel, Zichron ya'akov (IL); Ezra Hanuka, Nesher (IL)

(73) Assignee: IMI TAMI INSTITUTE FOR RESEARCH AND DEVELOPMENT LTD., Haifa Bay (IL)

( * ) Notice: Subject to any disclaimer, the term of this patent is extended or adjusted under 35 U.S.C. 154(b) by 663 days.

(21) Appl. No.: 16/495,580

(22) PCT Filed: Mar. 19, 2018

(86) PCT No.: PCT/IL2018/050309
§ 371 (c)(1),
(2) Date: Sep. 19, 2019

(87) PCT Pub. No.: WO2018/173041
PCT Pub. Date: Sep. 27, 2018

(65) Prior Publication Data
US 2020/0015495 A1   Jan. 16, 2020

Related U.S. Application Data

(60) Provisional application No. 62/473,502, filed on Mar. 20, 2017.

(51) Int. Cl.
A23J 1/14    (2006.01)
A23J 3/14    (2006.01)

(52) U.S. Cl.
CPC .. *A23J 1/14* (2013.01); *A23J 3/14* (2013.01)

(58) Field of Classification Search
CPC .................................. A23J 1/14; A23J 3/14
USPC .............................................. 426/46; 530/370
See application file for complete search history.

(56) References Cited

U.S. PATENT DOCUMENTS 3,607,860 A   9/1971 Yamato et al.
4,072,670 A   2/1978 Goodnight, Jr. et al.
(Continued)

FOREIGN PATENT DOCUMENTS

WO   2018011786 A1   1/2018

OTHER PUBLICATIONS

PCT Written Opinion For International Application No. PCT/IL2018/050309, dated Jun. 7, 2018, 6pp.
(Continued)

*Primary Examiner* — Hamid R Badr
(74) *Attorney, Agent, or Firm* — The Roy Gross Law Firm, LLC; Roy Gross

(57) ABSTRACT

A method for separating protein from plant or algae material is disclosed. The method comprises mixing the protein-containing material with a solvent, preferably water; extracting the protein-containing material at pH>7; and acidifying the mixture, thereby precipitating protein and fiber together. In some embodiments of the invention, the separation additionally comprises decanting the mixture to recover a protein/fiber solid; adding water to the protein/fiber solid; adding a predetermined quantity of base to the protein/fiber/water system, thereby precipitating fiber; separating the fiber from the protein in a decanter; and drying the protein solution. In other embodiments, the protein/fiber solid is processed directly, e.g. by being passed to an extruder. The use of the fiber as a carrier for the protein makes the inventive method more efficient than methods known in the art; in particular, the inventive method does not require the use of a high-g clarifier centrifuge.

20 Claims, 1 Drawing Sheet

(56) References Cited

U.S. PATENT DOCUMENTS

| | | | |
|---|---|---|---|
| 4,771,126 A | | 9/1988 | Hirotsuka et al. |
| 5,410,021 A | * | 4/1995 | Kampen .................. A23J 1/12 536/128 |
| 6,335,043 B1 | | 1/2002 | Jiang et al. |
| 2003/0013852 A1 | | 1/2003 | Sakata et al. |
| 2004/0028799 A1 | | 2/2004 | Ishikawa et al. |
| 2012/0021457 A1 | | 1/2012 | Tang |
| 2016/0309743 A1 | * | 10/2016 | Spinelli .................. A23P 10/20 |

OTHER PUBLICATIONS

Sustainable Protein Technology, Evaluation on the STW Protein programme and an outlook for the future, 60pp, Wageningen University.
Wang Tong Preparation of soy protein concentrate and isolate from extruded-expelled soybean meals, Journal of the American Oil Chemists' Society, Jul. 2004, vol. 81, No. 7, 713-717 pp.
PCT Search Report For International Application No. PCT/IL2018/050309, dated Jun. 7, 2018, 4pp.
PCT Notification of Transmittal of Preliminary report on Patentability for International Application No. PCT/IL2018/050309, dated Apr. 28, 2019, 1pp.
PCT International Searching Authority for International Application No. PCT/IL2018/050309, dated Jun. 7, 2018, 1pp.
European First Examination Report for Applicaiton No. 18 772 035.4-1106, dated Oct. 30, 2020, 6 pp.
PCT Intentional Preliminary report on Patentability for International Application No. PCT/IL2018/050309, dated Jan. 20, 2019, 15 pp.

* cited by examiner

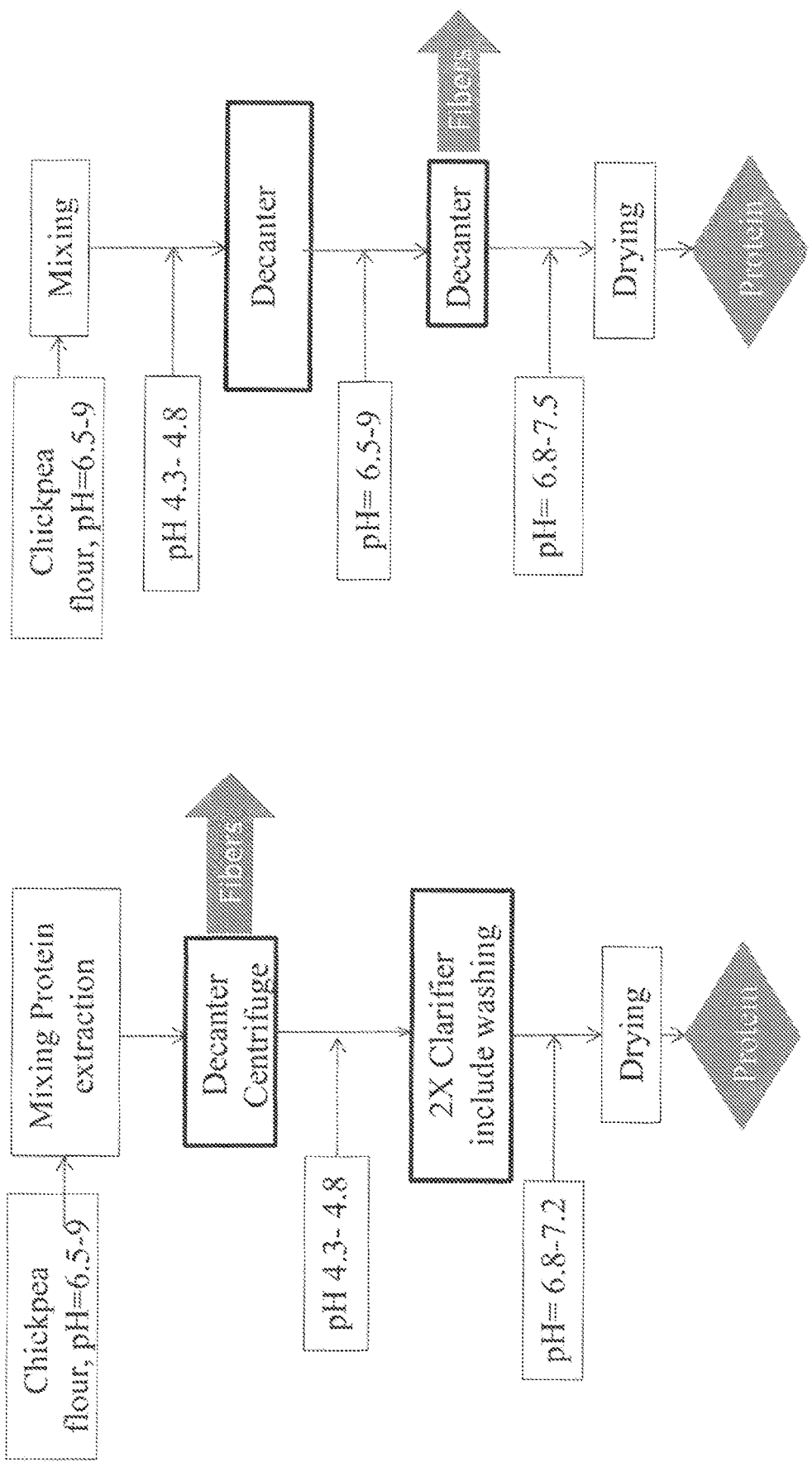

PROCESS FOR EXTRACTION OF PROTEIN FROM PLANT OR ALGAL MATTER

CROSS-REFERENCE TO RELATED APPLICATIONS

This application is the United States national phase of International Application No. PCT/IL2018/050309 filed Mar. 19, 2018, and claims priority to United States Provisional Patent Application No. 62/473,502, filed Mar. 20, 2017, the disclosures of which are hereby incorporated by reference in their entirety.

FIELD OF THE INVENTION

This invention is directed in general to methods for extracting protein from protein-containing material derived from plants or algae. It is directed in particular to methods for extracting protein from plant or algal matter in which fibers are used as a carrier in order to give a better separation of the protein.

BACKGROUND OF THE INVENTION

Plant matter, particularly from plants such as legumes, is a well-known source of protein. In methods known in the art, the extraction process generally comprises mixing the plant matter with a solvent, centrifuging and decanting or filtration to remove fibrous matter and acidifying the remaining material after separation in the clarifier to produce a crude protein extract. Sugars and starch are generally separated at this point for concentration to produce molasses. The crude protein extract is rehydrated, the water additionally being used to wash out salts, sugars, and starch from the protein extract. The crude protein extract is then fed to a clarifying centrifuge to produce a second extract. Water is added to this second extract in order to adjust the solid content to 8-15%, and the pH is then brought to near neutral by addition of base. Dry protein powder is then produced by spray-drying the second extract. A schematic outline of the steps in methods known in the art such as the one described here is presented in FIG. 1A.

In methods known in the art, the clarifier used for isolating the protein from the supernatant liquid represents a bottleneck in the process, limiting the throughput of the process as well as the efficiency of the separation and purification.

International (PCT) Pat. Appl. Pub. No. WO2018/011786 (henceforth '786) discloses a method for producing a protein concentrate derived from legumes such as chickpeas. The method comprises suspending legume material in water, debittering the legume material, and extracting the proteins from the debittered material. The debittering is preferably performed by reacting the legume material with fumaric acid, and the extraction is preferably performed by basifying the debittered legume product.

There thus remains a long-felt yet unmet need for a process for extraction of protein from plant matter that separates the protein more efficiently than those methods known in the art.

SUMMARY OF THE INVENTION

The method disclosed herein is designed to meet this long-felt need. In particular, the method uses plant fiber as a carrier for the protein rather than separating it out in an initial step. Using the plant fiber as a carrier for the protein is achieved by acidifying a suspension of plant material prior to any step of decanting, thereby producing a protein/fiber precipitate that can be used as is for further processing, or from which the protein can be separated easily and efficiently.

It is therefore an object of this invention to disclose a method for extracting protein from protein-containing material derived from plants or algae, comprising: (a) mixing said protein-containing material with a solvent, thereby producing a suspension of said protein-containing material in said solvent; (b) extracting said protein-containing material at pH>7; (c) acidifying said suspension, thereby producing a protein/fiber precipitate and a supernatant liquid; and, (d) separating said protein/fiber precipitate from said supernatant liquid to recover a protein/fiber solid.

It is a further object of this invention to disclose such a method, wherein said step of extracting comprises: adding sufficient base to said suspension to raise the pH to above 7; and, holding said suspension at basic pH until a predetermined fraction of said protein-containing material has been extracted. In some preferred embodiments of the method, said predetermined fraction is at least 95% by weight.

It is a further object of this invention to disclose the method as defined in any of the above, wherein said step of extracting is performed prior to any step of adding acid to said protein-containing material.

It is a further object of this invention to disclose the method as defined in any of the above, wherein said step of acidifying comprises acidifying by addition of an acid other than fumaric acid.

It is a further object of this invention to disclose the method as defined in any of the above, wherein said method does not comprise any step of debittering.

It is a further object of this invention to disclose the method as defined in any of the above, wherein said protein-containing material is plant-derived. In some preferred embodiments of the invention, said plant-derived material is derived from a plant selected from the group consisting of pea, chickpea, moringa, mallow, amaranth. hemp, and soy. In some particularly preferred embodiments of the invention, said plant material comprises material selected from the group consisting of pea flour and chickpea flour.

It is a further object of this invention to disclose the method as defined in any of the above, wherein said protein-containing material is algae-derived.

It is a further object of this invention to disclose the method as defined in any of the above, wherein said solvent is water.

It is a further object of this invention to disclose the method as defined in any of the above, wherein said step of extracting comprises extracting at a pH of about 9.

It is a further object of this invention to disclose the method as defined in any of the above, wherein said step of acidifying comprises acidifying said suspension to its isoelectric point.

It is a further object of this invention to disclose the method as defined in any of the above, wherein said step of acidifying comprises acidifying said suspension to a pH of between 4.3 and 4.8.

It is a further object of this invention to disclose the method as defined in any of the above, wherein said step of separating said protein/fiber precipitate from said supernatant liquid comprises at least one step selected from the group consisting of (a) separating said protein/fiber precipitate from said supernatant liquid by decanting; and (b) separating said protein/fiber precipitate from said supernatant liquid by filtration. In some preferred embodiments of the invention, said step of separating said fiber from said protein solution comprises separating said fiber from said protein by decanting.

It is a further object of this invention to disclose the method as defined in any of the above, wherein said step of separating said protein/fiber precipitate from said supernatant liquid to recover a protein/fiber solid is followed by a step of washing said protein/fiber solid to remove at least one substance selected from the group consisting of liquids, fat, sugars, and starch.

It is a further object of this invention to disclose the method as defined in any of the above, wherein said method does not comprise any step requiring the use of a high g-force clarifier.

It is a further object of this invention to disclose the method as defined in any of the above comprising: adding water to said protein/fiber solid, thereby producing a protein/fiber/water mixture; adding a predetermined quantity of base to said protein/fiber/water mixture, thereby precipitating fiber and producing a protein solution; and, separating said fiber from said protein solution. In some preferred embodiments of the invention, it comprises drying said protein solution following said step of separating said fiber from said protein solution, thereby producing dry protein. In some particularly preferred embodiments of the invention, said step of drying said protein solution comprises drying said protein by spray-drying. In preferred embodiments of the invention, said step of adding a predetermined quantity of base to said protein/fiber/water mixture comprises basifying said mixture to a pH of between 6.5 and 10. In some particularly preferred embodiments of the invention, said step of basifying said mixture to a pH of between 6.5 and 10 comprises basifying said mixture to a pH of between 8 and 9. In some preferred embodiments of the invention, said step of separating said fiber from said protein solution is followed by a step of adjusting said protein solution to a pH of between 6.8 and 7.5.

It is a further object of this invention to disclose the method as defined above, comprising passing said protein/fiber solid to an extruder. In some preferred embodiments of the method in which it comprises passing said protein/fiber solid to an extruder, said protein-containing material is comprises material derived from soy.

BRIEF DESCRIPTION OF THE DRAWING

The invention will now be described with reference to the drawing, wherein:

FIG. 1 presents a schematic comparison of methods known in the art (FIG. 1A) and the method disclosed herein (FIG. 1B) for production of protein from plant material.

DETAILED DESCRIPTION OF THE PREFERRED EMBODIMENTS

In the following description, various aspects of the invention will be described. For the purposes of explanation, specific details are set forth in order to provide a thorough understanding of the invention. It will be apparent to one skilled in the art that there are other embodiments of the invention that differ in details without affecting the essential nature thereof. In particular, while in some cases, for clarity or conciseness, different elements of the invention or different method steps are discussed individually, any combination of elements disclosed herein that is not self-contradictory is considered by the inventors to be within the scope of the invention. In addition, examples presented herein are presented in order to assist a person having ordinary skill in the art to understand how to make and use the invention herein disclosed, and are not to be construed as limiting the invention in any way. Rather, the invention for which protection is sought is that defined by the claims, according to the broadest reasonable interpretation of said claims.

As used herein, with reference to numerical quantities, the term "about" refers to a range of ±20% about the nominal value.

Unless otherwise stated, all concentrations are given as percentages by weight.

Reference is now made to FIG. 1B, which presents a schematic outline of the steps in the novel process of the present invention. In contrast to methods known in the art such as those outlined in FIG. 1A, in which the plant fiber is separated at an early stage of the process after the basic extraction has been performed, in the method herein disclosed, the fiber serves as a carrier for the protein, leading to a more efficient separation of the protein from the remainder of the plant matter. The method described herein can be used to extract protein from any kind of material derived from algae or plants that is suitable for use as a source of protein. In some embodiments of the invention, the material is derived from algae. In some preferred embodiments of the invention, the material is derived from plants. In some more preferred embodiments of the invention, the material is plant matter derived from a plant selected from the group consisting of pea, chickpea, moringa, mallow, amaranth, hemp, and soy. In some particularly preferred embodiments of the invention, the plant matter comprises pea flour and/or chickpea flour.

In the inventive method, plant matter is mixed with a solvent (preferably water) to form a suspension. Sufficient base, typically NaOH, is then added to raise the pH to >7 and the resulting suspension held at basic pH until the protein, or a desired fraction thereof, has been extracted. In preferred embodiments of the invention, the extraction is performed at a pH of about 9, i.e. under conditions sufficiently basic to provide essentially complete hydrolysis of the protein content of the plant or algal material. In typical embodiments of the invention, more than 95% by weight of the protein is extracted into the aqueous phase. In contrast to methods known in the art, in preferred embodiments of the method, the fiber is not separated at this point. Rather, after the protein extraction, the plant matter/solvent mixture is acidified, preferably to its isoelectric point, which is generally a pH of between 4.3 and 4.8. In typical embodiments of the invention, HCl is used, although any acid that is suitable for use in the process ($H_3PO_4$ being a non-limiting example) may be used. The acidification leads to co-precipitation of the protein and fiber. In contrast to literature methods, the acidificiation step of the method disclosed herein precedes rather than follows the step of decanting or clarification. Additionally, in contrast to the method disclosed in '786, the method disclosed does not require the use of fumaric acid.

After the acidification, the resulting protein/fiber precipitate is then separated from the supernatant liquid, preferably in a decanter. The protein/fiber precipitate is then retrieved for further processing. In preferred embodiments of the invention, the protein/fiber precipitate is then washed to remove impurities such as liquid sugars and starch. The washing is preferably performed at acidic pH in order to prevent dissolution of the precipitate and loss of protein to the supernatant liquid. It is most preferably performed at isoelectric pH.

In some preferred embodiments, the protein is separated from the protein/fiber precipitate. In these embodiments, the protein is preferably separated according to the following method. Solvent, preferably water, is added to the protein/fiber solids and the pH adjusted by addition of base (in preferred embodiments, by addition of a solution of NaOH). In preferred embodiments, the pH is adjusted to between 6.5 and 9, thereby dissolving the protein while leaving the fiber undissolved. The solid fiber is then separated from the supernatant protein-containing solution, preferably in a decanter. If the condition of the fiber suspension requires it, a clarifier centrifuge can be used in addition to the decanter to separate the fiber in order to ensure that any remaining small pieces of fiber have been removed. In contrast to literature methods, in which the use of a high g-force clarifier is not only required, but represents the bottleneck of the process, in the method disclosed herein, the use of a clarifier is not generally necessary. The use of a clarifier can be useful in some cases to provide a desired final cut from what is not separated in the decanter, but even in these cases, a high g-force clarifier of a type generally known in the art in that uses forces of thousands or tens of thousands of g's is not needed. In preferred embodiments of the invention disclosed herein, the pH of the protein-containing solution is adjusted to near neutral following the separation of the fiber from the protein-containing solution, most preferably to a pH of between 6.8 and 7.5.

In preferred embodiments of the invention, the protein-containing solution is then dried to yield dry protein extract. In particularly preferred embodiments of the invention, the protein-containing solution is passed to a spray dryer, where it is dried by spray drying.

As described above, due to the efficiency of the basic extraction, in some embodiments of the invention, rather than separating the protein from the plant material, the protein/fiber precipitate produced following the initial acidification is used as is without any additional processing. In preferred embodiments, the protein/fiber precipitate is transferred directly to an extruder in order to produce a plant product that is high in protein and also contains fiber. This direct transfer is particularly useful when the plant matter is high in protein. In some non-limiting embodiments, the protein concentration of the protein/fiber precipitate sent to the extruder is ≥50%; the exact minimum protein concentration necessary to provide a useful product depends on the specific requirements of the desired product and the use to which it will be put. The inventors have found that protein/fiber precipitate derived from soy is particularly well-suited to direct transfer to the extruder. The extruded material can then be processed according to methods known in the art.

We claim:

1. A method for extracting protein from protein-containing material derived from plants or algae, comprising:
   mixing said protein-containing material with a solvent, thereby producing a suspension of said protein-containing material in said solvent;
   extracting said protein-containing material at pH>7;
   acidifying said suspension, thereby producing a protein/fiber precipitate and a supernatant liquid; and,
   separating said protein/fiber precipitate from said supernatant liquid to recover a protein/fiber solid;
   wherein said method is performed under at least one condition selected from the group consisting of:
   said step of acidifying occurs prior to any step of decanting; and,
   said step of acidifying occurs prior to any step of separating protein from fiber.

2. The method according to claim 1, wherein said step of extracting comprises:
   adding sufficient base to said suspension to raise the pH to above 7; and,
   holding said suspension at basic pH until a predetermined fraction of said protein-containing material has been extracted.

3. The method according to claim 2, wherein said predetermined fraction is at least 95% by weight.

4. The method according to claim 1, wherein said step of extracting is performed prior to any step of adding acid to said protein-containing material.

5. The method according to claim 1, wherein said method does not comprise any step of debittering.

6. The method according to claim 1, wherein said protein-containing material is derived from a plant selected from the group consisting of pea, chickpea, moringa, mallow, amaranth, hemp, and soy.

7. The method according to claim 1, wherein said protein-containing material is algae-derived.

8. The method according to claim 1, wherein said solvent is water.

9. The method according to claim 1, wherein said step of extracting comprises extracting at a pH of about 9.

10. The method according to claim 1, wherein said step of acidifying comprises acidifying said suspension to its isoelectric point.

11. The method according to claim 1, wherein said step of acidifying comprises acidifying said suspension to a pH of between 4.3 and 4.8.

12. The method according to claim 1, wherein said step of separating said protein/fiber precipitate from said supernatant liquid comprises at least one step selected from the group consisting of:
    separating said protein/fiber precipitate from said supernatant liquid by decanting; and,
    separating said protein/fiber precipitate from said supernatant liquid by filtration.

13. The method according to claim 1, wherein said step of separating said protein/fiber precipitate from said supernatant liquid to recover a protein/fiber solid is followed by a step of washing said protein/fiber solid to remove at least one substance selected from the group consisting of liquids, fat, sugars, and starch.

14. The method according to claim 1, wherein said method does not comprise any step requiring the use of a high g-force clarifier.

15. The method according to claim 1, comprising:
    adding water to said protein/fiber solid, thereby producing a protein/fiber/water mixture;
    adding a predetermined quantity of base to said protein/fiber/water mixture, thereby precipitating fiber and producing a protein solution; and,
    separating said fiber from said protein solution.

16. The method according to claim 15, comprising drying said protein solution following said step of separating said fiber from said protein solution, thereby producing dry protein.

17. The method according to claim 16, wherein said step of drying said protein solution comprises drying said protein by spray-drying.

18. The method according to claim 15, wherein said step of adding a predetermined quantity of base to said protein/fiber/water mixture comprises basifying said mixture to a pH of between 6.5 and 10.

19. The method according to claim 1, comprising passing said protein/fiber solid to an extruder.

20. The method according to claim 19, wherein said protein-containing material comprises material derived from soy.

* * * * *